United States Patent [19]
Yamamoto

[11] Patent Number: 5,546,308
[45] Date of Patent: Aug. 13, 1996

[54] APPARATUS FOR CONTROLLING VEHICLE SPEED IN RESPONSE TO A ROAD HOLDING ABILITY CHANGE

[75] Inventor: Masaki Yamamoto, Kakegawa, Japan

[73] Assignee: Toyota Jidosha Kabushiki Kaisha, Toyota, Japan

[21] Appl. No.: 375,564

[22] Filed: Jan. 13, 1995

Related U.S. Application Data

[63] Continuation of Ser. No. 186,553, Jan. 26, 1994, abandoned.

[30] Foreign Application Priority Data

Feb. 19, 1993 [JP] Japan ...................... 5-030889

[51] Int. Cl.$^6$ .................................. B60K 41/00
[52] U.S. Cl. ................ 364/426.04; 364/424.01; 364/426.01; 180/197
[58] Field of Search ............... 364/424.01, 424.03, 364/426.01, 426.02, 426.03, 426.04; 180/197

[56] References Cited

U.S. PATENT DOCUMENTS

| | | | |
|---|---|---|---|
| 3,934,125 | 1/1976 | Macano | 235/150.2 |
| 4,099,592 | 7/1978 | Gonzales | 180/108 |
| 4,134,373 | 1/1979 | Kibler et al. | 123/102 |
| 4,375,207 | 3/1983 | Siebler et al. | 123/333 |
| 4,664,080 | 5/1987 | Minks | 123/335 |
| 4,887,684 | 12/1989 | King | 180/179 |
| 4,909,074 | 3/1990 | Gerresheim et al. | 73/146.4 |
| 5,009,208 | 4/1991 | Florenza, II | 123/335 |
| 5,070,960 | 12/1991 | Nobumoto et al. | 364/426.02 |
| 5,163,530 | 11/1992 | Nakamura et al. | 364/426.01 |
| 5,200,897 | 4/1993 | Makino et al. | 364/426.02 |
| 5,210,692 | 5/1993 | Fennel et al. | 364/426.02 |
| 5,239,469 | 8/1993 | Walker et al. | 364/424.03 |
| 5,240,094 | 8/1993 | Suzuki | 364/426.01 |
| 5,255,193 | 10/1993 | Katayose et al. | 364/426.02 |
| 5,258,912 | 11/1993 | Ghoneim et al. | 364/424.05 |
| 5,280,432 | 1/1994 | Kuwana et al. | 364/426.02 |
| 5,281,008 | 1/1994 | Kawamura et al. | 364/426.02 |
| 5,292,184 | 3/1994 | Takata | 303/100 |

FOREIGN PATENT DOCUMENTS

| | | |
|---|---|---|
| 3236520A1 | 4/1984 | Germany. |
| 3308080A1 | 9/1984 | Germany. |
| 3539489A1 | 5/1987 | Germany. |
| 3915879A1 | 11/1990 | Germany. |
| 60-148771 | 8/1985 | Japan. |
| 62-59169 | 3/1987 | Japan. |

*Primary Examiner*—Michael Zanelli
*Assistant Examiner*—Stephen J. Walder, Jr.
*Attorney, Agent, or Firm*—Oliff & Berridge

[57] ABSTRACT

A vehicle speed control apparatus includes a detecting unit for detecting that a road holding ability relating to tires of an automotive vehicle during running operation has changed to be lower than a reference value, and a control unit for performing a vehicle speed control process when the change of the road holding ability is detected by the detecting unit, so as to prevent the vehicle speed from being excessively increased when the road holding ability is reduced.

10 Claims, 13 Drawing Sheets

- - - - NORMAL TIRE CONDITION
——— ABNORMAL TIRE CONDITION

- - - - NORMAL TIRE CONDITION
——— ABNORMAL TIRE CONDITION

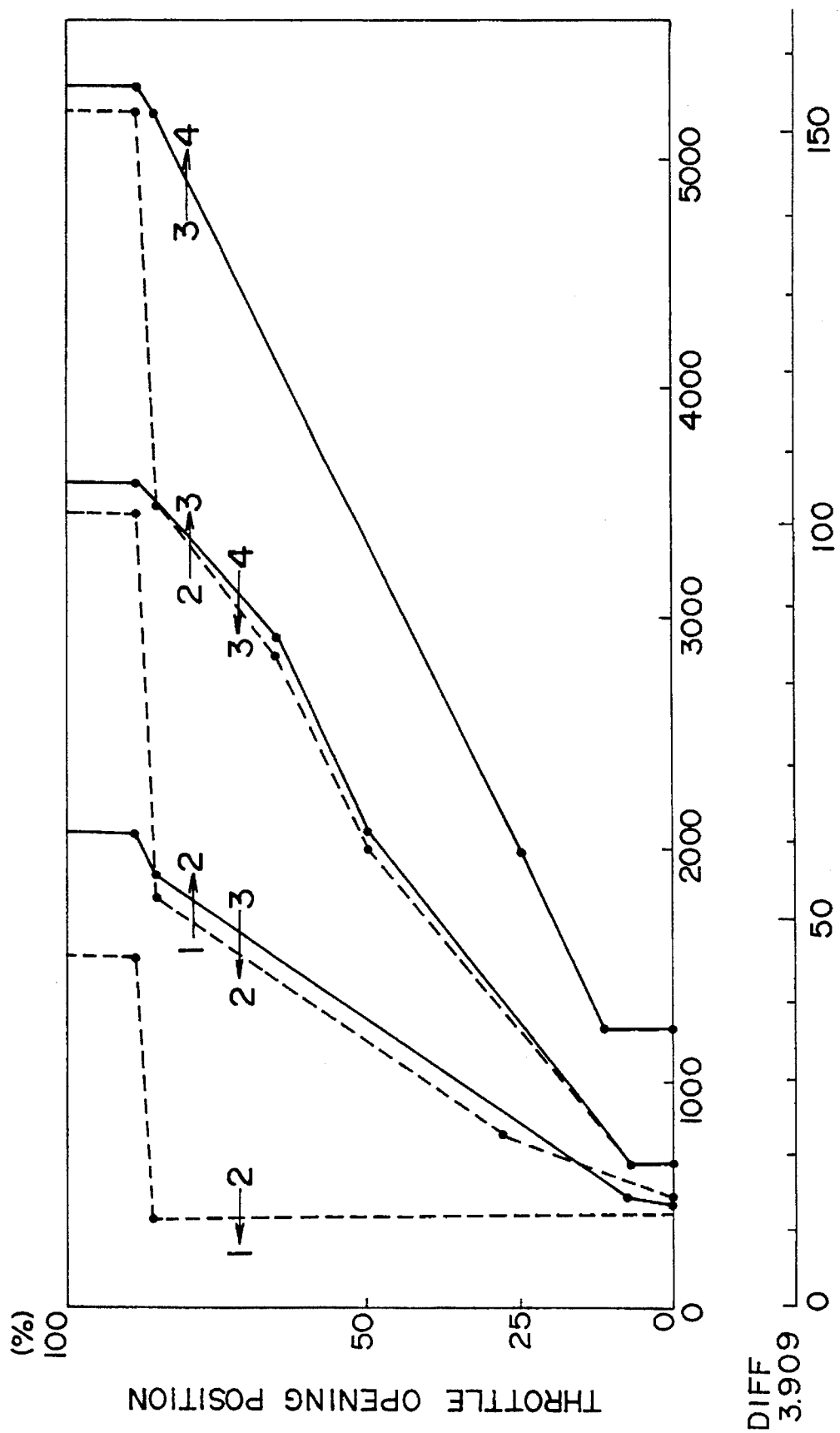
FIG. 13 (VEHICLE SPEED CONTROL MODE)

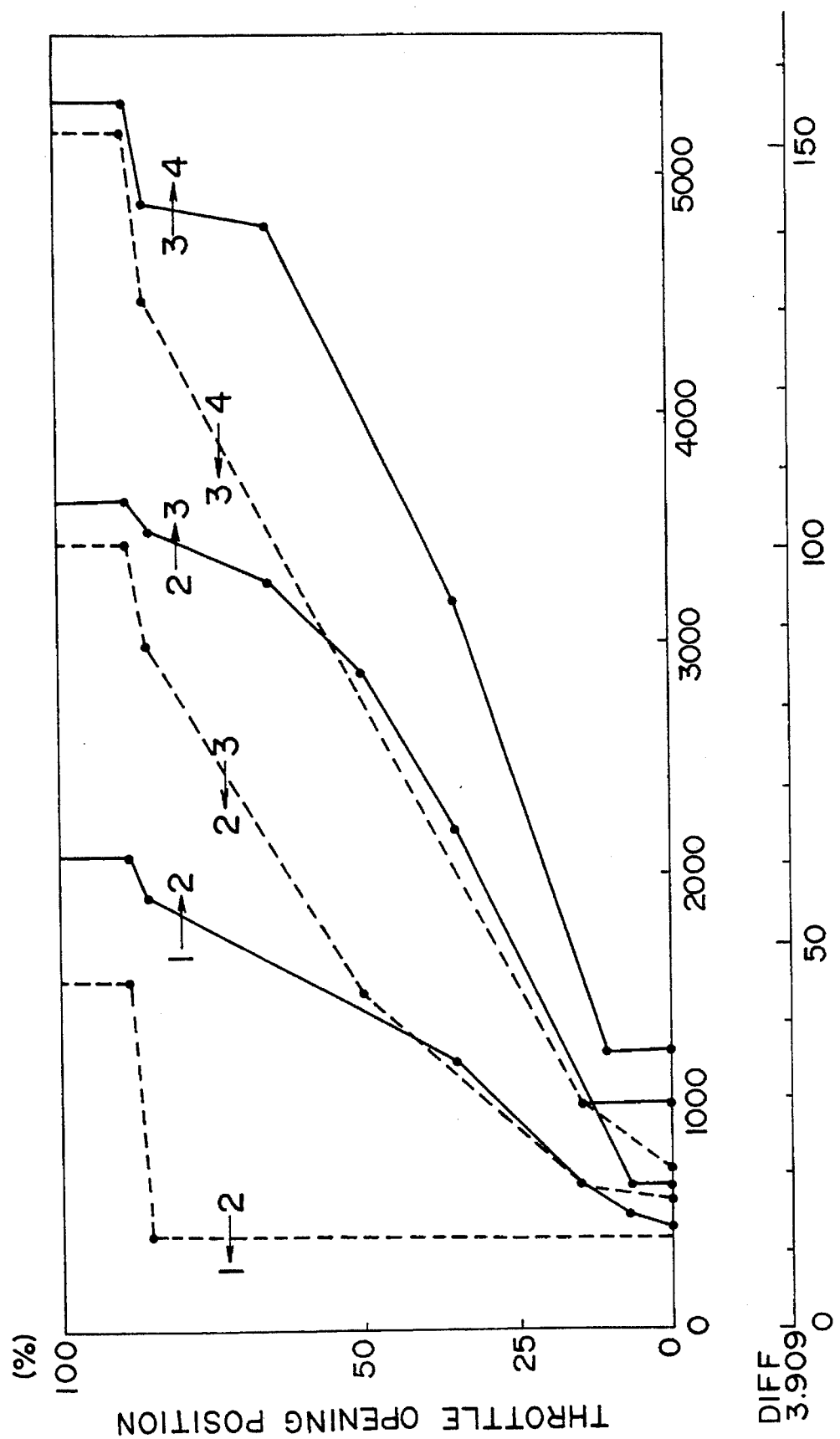

1

APPARATUS FOR CONTROLLING VEHICLE SPEED IN RESPONSE TO A ROAD HOLDING ABILITY CHANGE

This is a Continuation of application Ser. No. 08/186,553 filed Jan. 26, 1994, now abandoned.

BACKGROUND OF THE INVENTION (1) Field of the Invention

The present invention generally relates to a vehicle speed control apparatus, and more particularly to an apparatus for controlling a vehicle speed in response to a change of a road holding ability relating to tires of an automotive vehicle during running operation so as to prevent the vehicle speed from becoming excessively high when the road holding ability is reduced.

(2) Description of the Related Art

In known automotive vehicles, the vehicle running performance is influenced by not only the vehicle structure but also the tire condition.

Japanese Laid-Open Patent Application No. 62-59169 discloses a proposed steering performance control apparatus which maintains steering performance in a certain condition when the tire inflation pressure changes. In the proposed apparatus in the above mentioned publication, the steering performance is adjusted so as to reduce the understeer effect of the vehicle when the tire condition is changed to a condition in which the front tire inflation pressure is lower than the rear tire inflation pressure. On the other hand, when the tire condition is changed to a condition in which the front tire inflation pressure is higher than the rear tire inflation pressure, the steering performance is adjusted so as to increase the understeer effect of the vehicle.

Japanese Laid-Open Patent Application No. 60-148771 discloses a proposed steering control apparatus. In this proposed apparatus, the turning angle relating to the rear wheels of a four-wheel-steering vehicle is controlled in response to a tire inflation pressure change.

However, the tire inflation pressure is not the only factor that influences the vehicle running performance. The vehicle running performance is influenced when the tire wear is increased, or when the spare tires which are different from standard tires are mounted on the vehicle. For example, there is a case in which a "tempa" spare tire is mounted on the vehicle. The "tempa" spare tires are one of the known spare tires, and the dimensions of the "tempa" spare tire (such as the diameter and the breadth) are smaller than the dimensions of the standard tire.

Generally, the decrease in the tire inflation pressure, the increase in the tire wear, and the mounting of the spare tires will lower the road holding ability of the tires. When the vehicle is subjected to one of these factors during the running operation, the vehicle stability and controllability performance becomes worse and the braking distance is increased.

FIG. 1A shows the relationship between the vehicle speed and the vehicle running stability and controllability performance. As shown in FIG. 1A, if the vehicle speed is increased to a higher speed, the running stability and controllability performance becomes worse. In FIG. 1A, a characteristic curve of the vehicle running stability and controllability performance when the tire condition is normal is indicated by a dotted line, and a characteristic curve of the vehicle running stability and controllability performance when the tire condition is abnormal is indicated by a solid line.

FIG. 1B shows the relationship between the vehicle speed and the braking distance. As shown in FIG. 1B, if the vehicle speed becomes higher, the braking distance is increased. In FIG. 1B, a characteristic curve of the braking distance when the tire condition is normal is indicated by a dotted line, and a characteristic curve of the braking distance when the tire condition is abnormal is indicated by a solid line.

In the conventional devices described above, the steering performance of the vehicle is prevented from being lowered when a tire inflation pressure reduction is detected. However the measures taken by the above described conventional devices are insufficient to increase the vehicle running performance and safety. With the conventional devices, it is difficult to prevent the vehicle running stability and controllability performance or the braking performance from being lowered when the road holding ability of the tires is reduced.

SUMMARY OF THE INVENTION

Accordingly, it is a general object of the present invention to provide an improved vehicle speed control apparatus in which the above described problem is eliminated.

Another, more specific object of the present invention is to provide a vehicle speed control apparatus which prevents the vehicle speed from being excessively increased when the road holding ability is detected as being reduced, so that the vehicle running stability and controllability and the braking performance are maintained at an appropriate level.

The above mentioned objects of the present invention are achieved by a vehicle speed control apparatus which includes a detecting unit for detecting that a road holding ability relating to tires of an automotive vehicle during running operation has changed to be lower than a reference value, and a control unit for performing a vehicle speed control process when the change of the road holding ability is detected by the detecting unit, so as to prevent the vehicle speed from being excessively increased when the road holding ability is reduced.

According to the present invention, when the road holding ability is detected as being reduced, the vehicle speed control process is performed so as to prevent the vehicle speed from being excessively increased. Thus, it is possible for the present invention to sufficiently eliminate the vehicle running stability and controllability deterioration and the braking performance decline when the road holding ability is reduced.

BRIEF DESCRIPTION OF THE DRAWINGS

The above and other objects, features and advantages of the present invention will be more apparent from the following detailed description when read in conjunction with the accompanying drawings in which:

FIGS. 13 and 14 are charts for explaining the operation of the transmission control unit.

DESCRIPTION OF THE PREFERRED EMBODIMENT

Figure 1A:
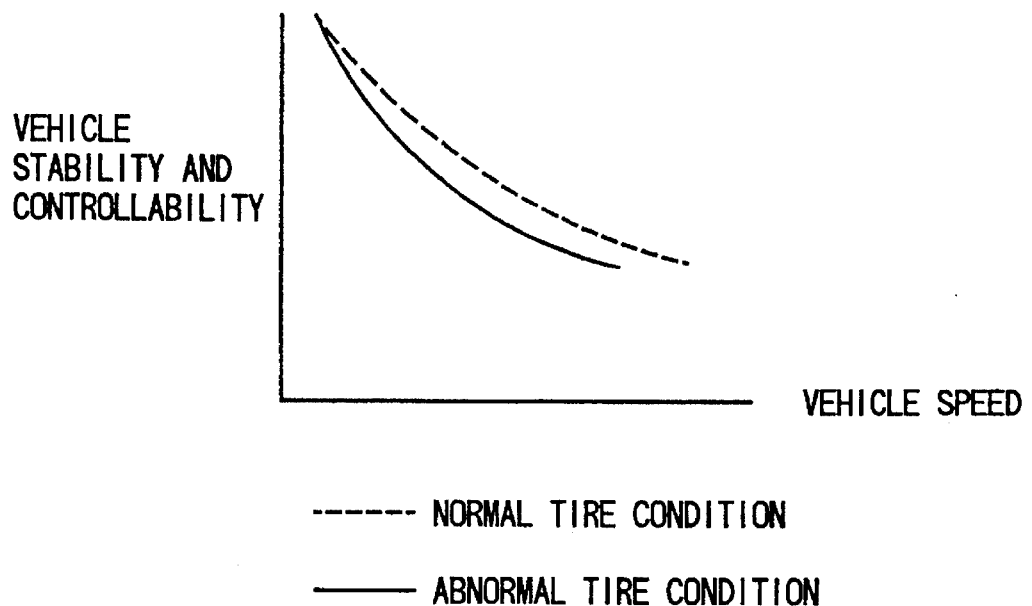
FIG. 1A is a chart showing the relationship between the vehicle speed and the vehicle stability and controllability.
Figure 1B:
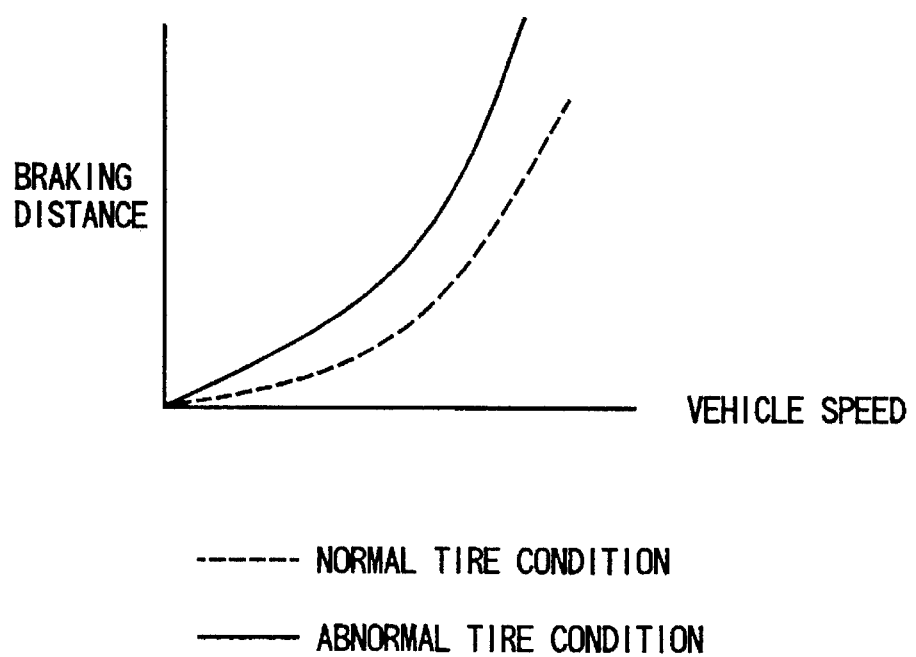
FIG. 1B is a chart showing the relationship between the vehicle speed and the braking distance.
Figure 2:
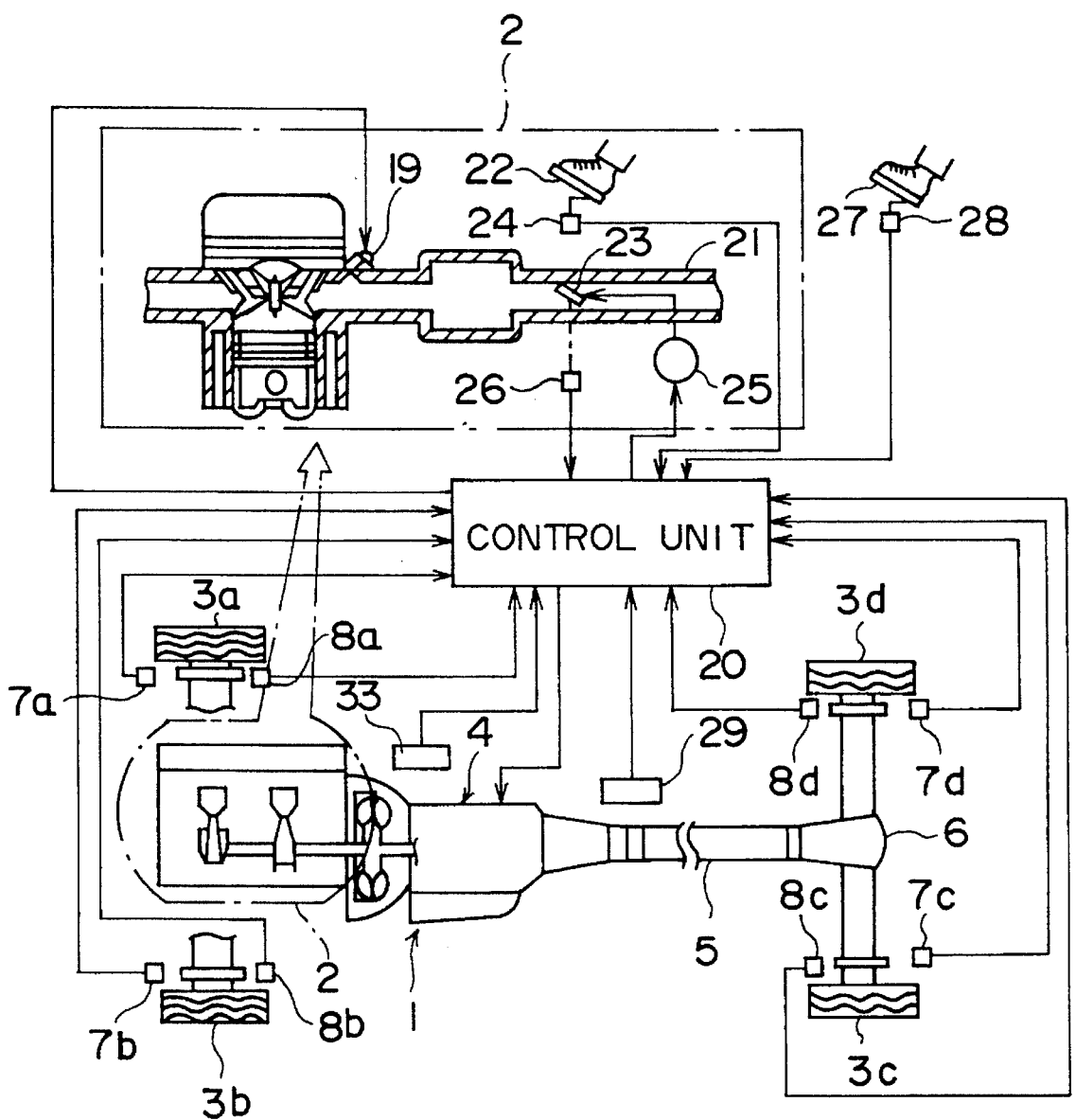
FIG. 2 is a diagram showing an automotive vehicle to which the present invention is applied.

A description will now be given, with reference to FIGS. 2 and 4, of an automotive vehicle to which the present invention is applied. In FIG. 2, the automotive vehicle 1 has an engine 2, an automatic transmission (AT) 4, and four wheels 3a through 3d. The wheels of the vehicle are the driven wheels 3a and 3b at the front right and front left of the vehicle, and the driving wheels 3c and 3d at the rear left and rear right of the vehicle. The driving wheels 3c and 3d are coupled to the rear axle of the vehicle, and the rear axle is connected at its intermediate portion to a drive shaft 5 via a differential gear 6. The power of the engine 1 is transferred to the driving wheels 3c and 3d through the automatic transmission 4, the drive shaft 5 and the differential gear 6, so that the vehicle 1 is propelled.

In the automotive vehicle in FIG. 2, four wheel speed sensors 7a through 7d are mounted so as to sense the respective rotational speeds of the wheels 3a through 3d. Four tire inflation pressure sensors 8a through 8d are also mounted to sense the respective tire inflation pressures of the four tires of the vehicle. The wheel speed sensors 7a–7d and the tire inflation pressure sensors 8a–8d are connected to a control unit 20 of the automotive vehicle 1. The structure and operation of the control unit 20 will be described later.

Figure 4:
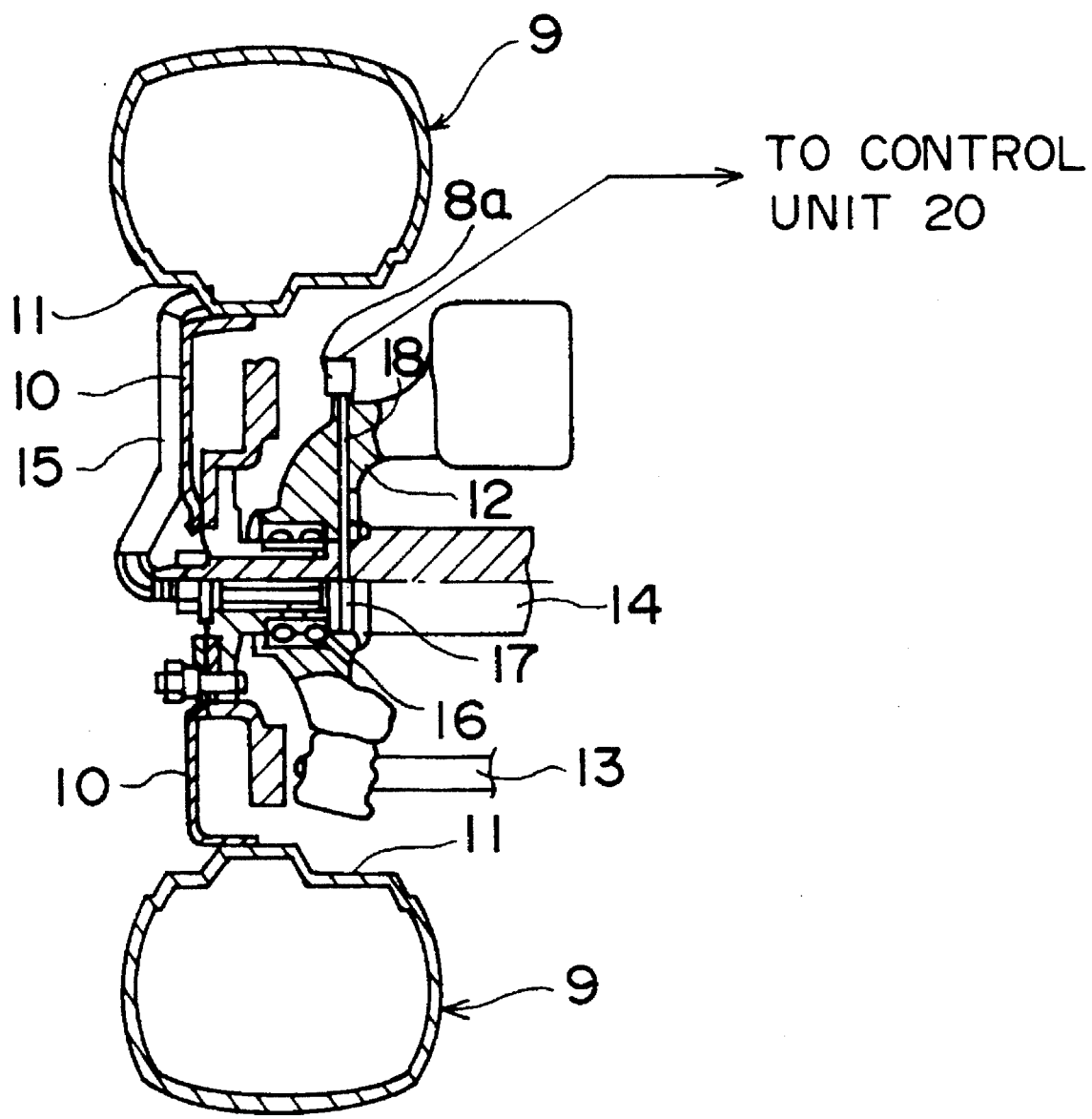
FIG. 4 is an enlarged, cross-sectional view showing a tire inflation pressure sensor of the vehicle in FIG. 2.

FIG. 4 shows the structure and mounting condition of one of the tire inflation pressure sensors 8a–8d. As the structure and mounting condition of any of the tire inflation pressure sensors are the same as those of the other tire inflation pressure sensors, only the structure and mounting condition of the tire inflation pressure sensor 8a is shown in FIG. 4 and the other sensors are omitted therein. In FIG. 4, a tire 9 is provided at the wheel 3a of the vehicle 1, and the tire 9 is secured to a rim 11 extending from a tire wheel 10. A shaft 14 of the vehicle 1 is rotatably supported by an upper arm 12 and a lower arm 13.

In FIG. 4, one end of an air tube 15 is connected to the tire 9, and the other end of the air tube 15 communicates with the leading edge of a hollow portion 16 which is formed within the shaft 14. The other end of the hollow portion 16 is open to an external groove 17 which is formed through the peripheral surface of the shaft 14 in an annular manner. A through hole 18 is formed within the upper arm 12 such that the through hole 18 communicates at its end with the external groove 17 of the shaft 14 and it longitudinally extends from one end of the external groove 17. The tire inflation pressure sensor 8a is connected to the other end of the through hole 18.

As described above, the tire inflation pressure sensor 8a in FIG. 4 is connected to the inside of the tire 9 through the air tube 15, the hollow portion 16, the external groove 17 and the through hole 18. Thus, the tire inflation pressure of the tire 9 can be sensed with the tire inflation pressure sensor 8a, and a detection signal indicating the sensed tire inflation pressure is supplied from the sensor 8a to the control unit 20 of the vehicle. As the external groove 17 is formed through the peripheral surface of the shaft 14 in an annular manner, the tire inflation pressure from the tire 9 is safely and stably transferred to the sensor 8a through the external groove 17 if the shaft 14 is rotated around the center axis thereof.

Referring back to FIG. 2, the automotive vehicle to which the present invention is applied will be described. The engine 2 of the vehicle 1 in FIG. 2 is an electronically controlled engine provided with a plurality of fuel injection valves. The operation of each of the fuel injection valves is controlled by a fuel injection control unit 31 (not shown in FIG. 2), which is an Electronic Fuel Injection Electronic Control Unit (EFI ECU) provided within the control unit 20. In FIG. 2, one of the plurality of fuel injection valves provided in the engine 2 is designated by the reference numeral 19, and the other fuel injection valves are omitted for the sake of convenience.

In the vehicle in FIG. 2, a throttle valve 23 is provided within an intake passage 21 extending to a combustion chamber of the engine 2. The throttle valve 23 is operated under the control of a link-less throttle control unit 30 in response to the position of an accelerator pedal 22 set by the vehicle operator, so that the throttle valve 23 opens or closes the intake passage 21 to control the flow of intake air toward the engine combustion chamber. The throttle control unit 30 is an Electronic Control Unit (ECU) which is provided within the control unit 20.

More specifically, the position of the accelerator pedal 22 set by the vehicle operator is sensed by an accelerator position sensor 24, and a signal indicating the accelerator position is supplied from the accelerator position sensor 24 to the throttle control unit 30 of the control unit 20. If other correction requirements are present, the result of the detection is corrected by the throttle control unit 30. The throttle valve actuator 25 is operated by the throttle control unit 30 in accordance with the result of the detection to move the throttle valve 23 to a desired throttle position, so that the throttle valve 23 opens or closes the intake passage 21 by means of the throttle valve actuator 25.

In addition, the position of the throttle valve 23 is sensed by a throttle position sensor 26, and a signal indicating the throttle position is transmitted from the throttle position sensor 26 to the control unit 20.

The operation of the automatic transmission 4 is controlled by a transmission control unit 32. The transmission control unit 32 is an Electronically Controlled Transmission Electronic Control Unit (ECT ECU) which is provided within the control unit 20. The gear-shift position of the automatic transmission 4 is determined by the transmission control unit 32 in accordance with the engine speed and the throttle position, and a shift change control process is carried out by the transmission control unit 32 with the determined gear-shift position to control the operation of the automatic transmission 4. As described above, a signal indicating the throttle position is supplied from the throttle position sensor 26 to the transmission control unit 32. In addition, the engine speed is sensed by an engine speed sensor (not shown) and a signal indicating the engine speed is supplied to the transmission control unit 32.

In the vehicle in FIG. 2, the position of a brake pedal 27 is set by the vehicle operator. A brake system (not shown) is arranged at the wheels 3a through 3d of the vehicle. The brake system is operated by the control unit 20 in response to the position of the brake pedal 27, so that the vehicle decelerates or stops running due to the braking force produced by the brake system on the wheels 3a–3d. A brake sensor 28 is provided at the brake pedal 27. The position of the brake pedal 27 is sensed by the brake sensor 28, and a signal indicating the brake pedal position is transmitted from the brake sensor 28 to the control unit 20.

In the vehicle in FIG. 2, an acceleration sensor 29 and a running distance sensor 33 are provided. The lateral acceleration and the forward acceleration of the vehicle 1 are sensed by the acceleration sensor 29, and signals indicating these accelerations are transmitted from the acceleration sensor 29 to the control unit 20. The vehicle running distance since the latest tire change of the vehicle 1 is measured by the running distance sensor 33, and a signal indicating the vehicle running distance is transmitted from the running distance sensor 33 to the control unit 20.

Next, a description will be given, with reference to FIGS. 3 through 14, of the operation of the control unit of the automotive vehicle to which the present invention is applied. In the vehicle speed control apparatus according to the present invention, the road holding ability of the tires is detected by the road holding ability detecting unit. In accordance with the result of the detection by the road holding ability detecting unit, the vehicle speed control part prevents the vehicle speed from being excessively increased when the road holding ability is changed to a lower level.

Figure 3:
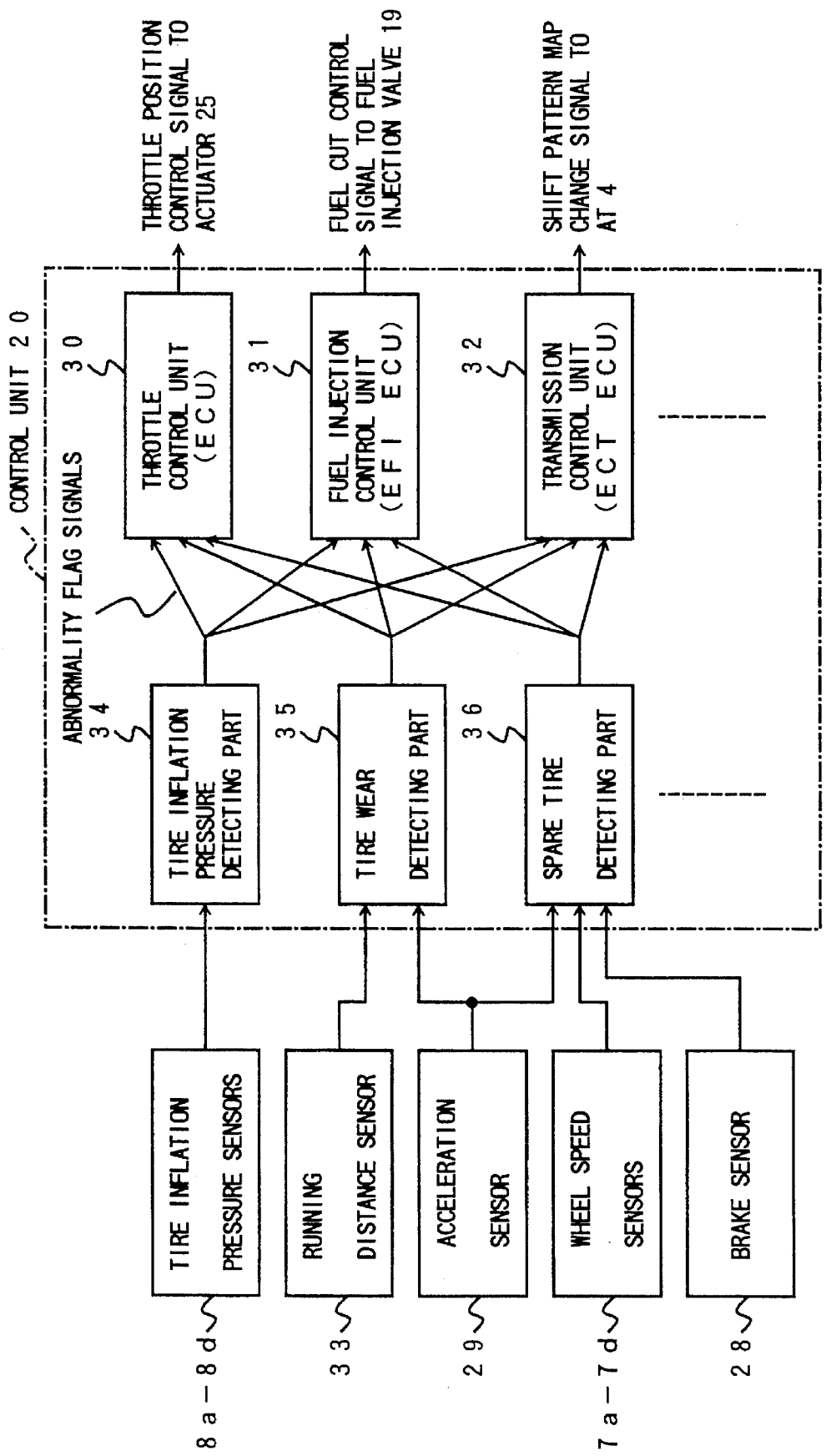
FIG. 3 is a block diagram showing a control unit provided within the automotive vehicle in FIG. 2.

FIG. 3 shows the control unit of the automotive vehicle in FIG. 2. In FIG. 3, the parts which are the same as corresponding parts in FIG. 2 are designated by the same reference numerals. The control unit 20 comprises a tire inflation pressure detecting part 34, a tire wear detecting part 35, and a spare tire detecting part 36. The function of the road holding ability detecting unit of the apparatus according to the present invention is achieved by any of the detecting parts 34–36 in FIG. 3.

In FIG. 3, the tire inflation pressure detecting part 34 is connected to the tire inflation pressure sensors 8a–8d to receive the tire inflation pressure signals from the sensors 8a–8d. The tire wear detecting part 35 is connected to the running distance sensor 33 to receive the vehicle running distance signal from the sensor 33, and it is connected to the acceleration sensor 29 to receive the vehicle acceleration signals from the sensor 29. The spare tire detecting part 36 is connected to the acceleration sensor 29, the wheel speed sensors 7a–7d and the brake sensor 28 to receive the signals from these sensors.

The control unit 20 further comprises the throttle control unit (ECU) 30, the fuel injection control unit (EFI ECU) 31, and the transmission control unit (ECT ECU) 32. The function of the vehicle speed control part of the apparatus according to the present invention is achieved by performing a control process by means of one of the control units 30–32 in FIG. 3. The throttle control unit 30 performs a throttle position control process to control the position of the throttle valve 23 in accordance with an abnormality flag signal output from one of the detecting parts 34–36. The fuel injection control unit 31 performs a fuel cut control process of the fuel injection valves in accordance with the abnormality flag signal output from one of the detecting parts 34–36. The transmission control unit 32 performs a shift control process of the automatic transmission 4 in accordance with the abnormality flag signal output from one of the detecting parts 34–36.

In the vehicle speed control apparatus according to the present invention, one of the detection processes of the detecting parts 34–36 and one of the control processes of the control units 30–32 can be performed on their own, or two or more processes among the detecting processes and two or more processes among the control processes can be performed in combination. It is desirable for higher vehicle running performance and safety that all of the detection processes and all of the control process are performed. In addition, each of the detection processes of the detecting parts 34–36 can be accomplished by means of either a microcomputer unit, different from the control units 30–32, provided within the vehicle, or a known interrupt routine provided within the control units 30–32.

Figure 5:
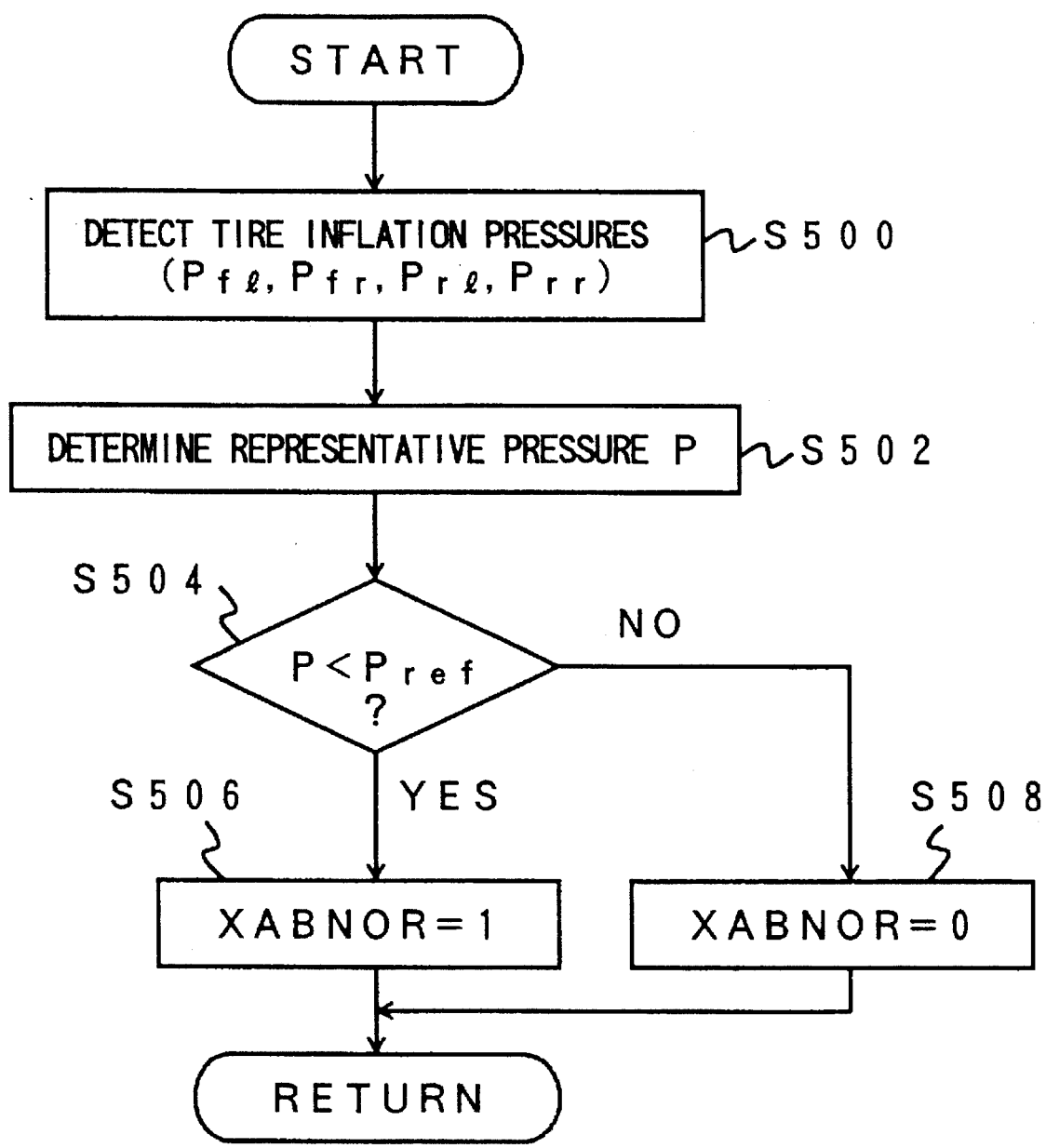
FIG. 5 is a flow diagram for explaining a tire inflation pressure detection process performed by a tire inflation pressure detecting part of the control unit in FIG. 3.

FIG. 5 shows the tire inflation pressure detection process performed by the tire inflation pressure detecting part 34 of the control unit 20 in FIG. 3. At the start of the tire inflation pressure detection process in FIG. 5, the tire inflation pressure detecting part 34 of the control unit 20, at step S500, detects the tire inflation pressures Pfl, Pfr, Prl and Prr relating to the front-left tire, the front-right tire, the rear-left tire and the rear-right tire of the vehicle 1, in accordance with the signals supplied from the tire inflation pressure sensors 8a–8d.

Step S502 determines the representative pressure P based on the detected tire inflation pressures Pfl, Pfr, Prl and Prr at step S500. This representative pressure P is determined at step S502 by calculating either the minimum value Pmin of the four pressures or the average value Pav thereof in accordance with the following calculation formulas:

the minimum value Pmin is:

$$Pmin=MIN\ (Pfl,\ Pfr,\ Prl,\ Prr) \tag{1}$$

the average value Pav is:

$$Pav=(Pfl+Pfr+Prl+Prr)/4 \tag{2}$$

After the representative pressure P is determined at step S502, step S504 detects whether or not the representative pressure P at step S502 is lower than a predetermined reference pressure Pref. If the result at step S504 is affirmative (P<Pref), step S506 sets an abnormality flag XABNOR to the value one (XABNOR=1), and the tire inflation pressure detection process in FIG. 5 is finished. On the other hand, if the result at step S504 is negative (P≧Pref), step S508 resets the abnormality flag XABNOR to zero (XABNOR=0), and the process in FIG. 5 is finished.

Through the above described procedure, the control unit 20 can detect whether or not any of the tire inflation pressures of the tires is excessively low by checking the value of the flag XABNOR. That is, if the flag XABNOR is equal to 1, it is determined that at least one of the tire inflation pressures is excessively low. If the flag XABNOR is equal to 0, it is determined that all of the tire inflation pressures are normal and they are not excessively low.

Figure 6:
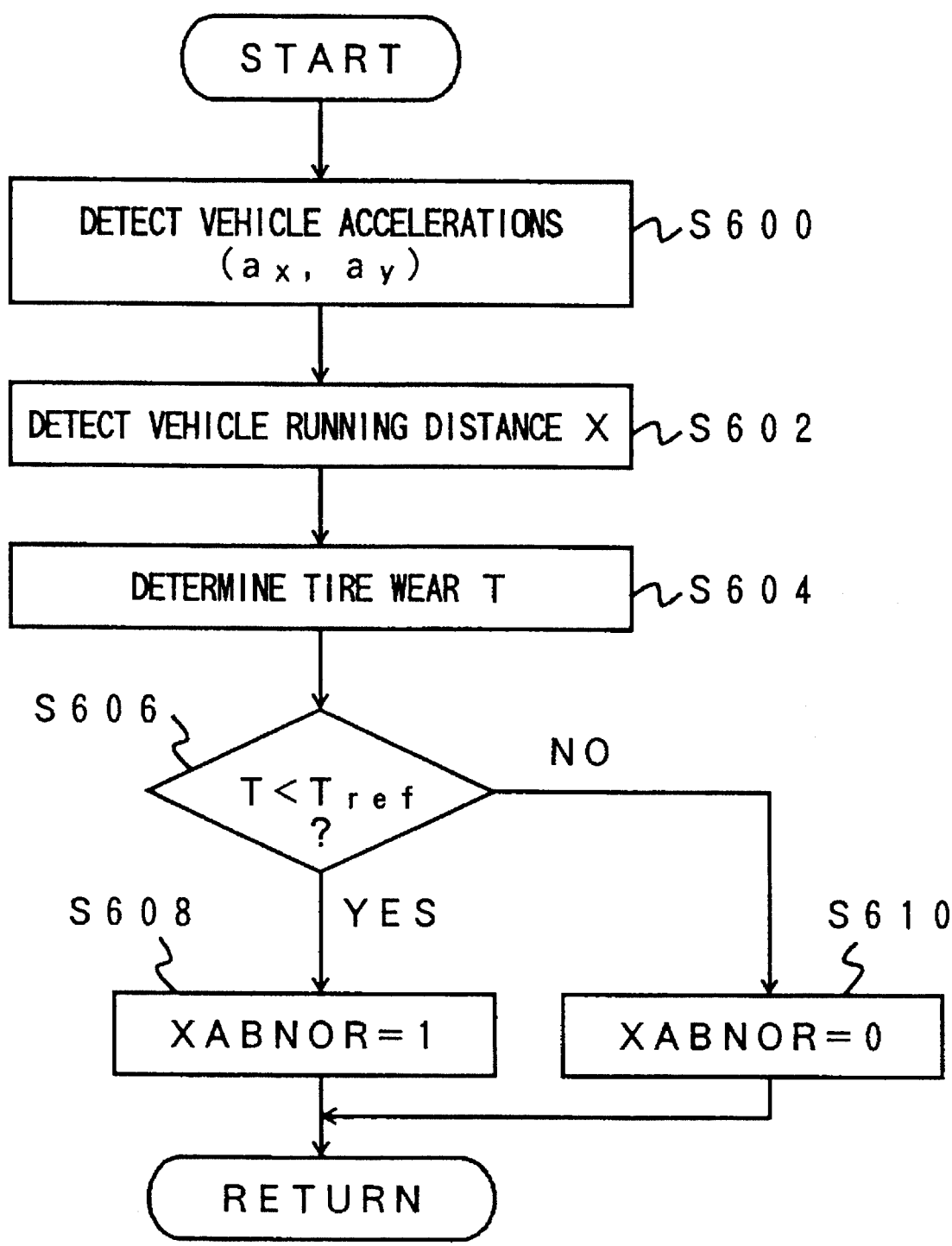
FIG. 6 is a flow diagram for explaining a tire wear detection process performed by a tire wear detecting part of the control unit in FIG. 3.

FIG. 6 shows the tire wear detection process performed by the tire wear detecting part 35 of the control unit 20 in FIG. 3. At the start of the tire wear detection process in FIG. 6, the tire wear detecting part 35 of the control unit 20, at step S600, detects the lateral acceleration "ax" and the forward acceleration "ay" of the vehicle 1 in accordance with the signals supplied from the acceleration sensor 29. Step S602 detects the vehicle running distance X since the latest tire change in accordance with the signal supplied from the running distance sensor 33.

Step S604 determines the tire wear T based on the detected vehicle accelerations ax and ay at step S600 and based on the detected vehicle running distance X at step S602. The tire wear T is determined at step S604 in accordance with the following calculation formulas:

$$T = (a/B + To) \cdot e^{-BX} - (a/B) \quad (3)$$

$$B = Ao + Ab \cdot ax^2 + Ac \cdot ay^2 \quad (4)$$

where:

"a" is a given coefficient, $ax^2$ is the average of the squares of the lateral accelerations, $ay^2$ is the average of the squares of the forward accelerations, Ao, Ab, Ac are given coefficients, To is the initial thickness of the tire tread, X is the vehicle running distance since the latest tire change.

After the tire wear T is determined at step S604, step S606 detects whether or not the tire wear value T at step S604 is smaller than a predetermined reference tire wear value Tref. If the result at step S606 is affirmative (T<Tref), step S608 sets the abnormality flag XABNOR to the value one (XABNOR=1), and the tire wear detection process in FIG. 6 is finished. On the other hand, if the result at step S606 is negative (T≧Tref), step S610 resets the abnormality flag XABNOR to zero (XABNOR=0), and the tire wear detection process in FIG. 6 is finished.

Through the above described procedure, the control unit 20 can detect whether or not the wear of any of the four tires is excessive by checking the signal of the abnormality flag XABNOR. That is, if the flag XABNOR is equal to 1, it is determined that the wear of at least one of the tires is excessive. If the flag XABNOR is equal to 0, it is determined that the wear of all of the tires are normal.

Figure 7:
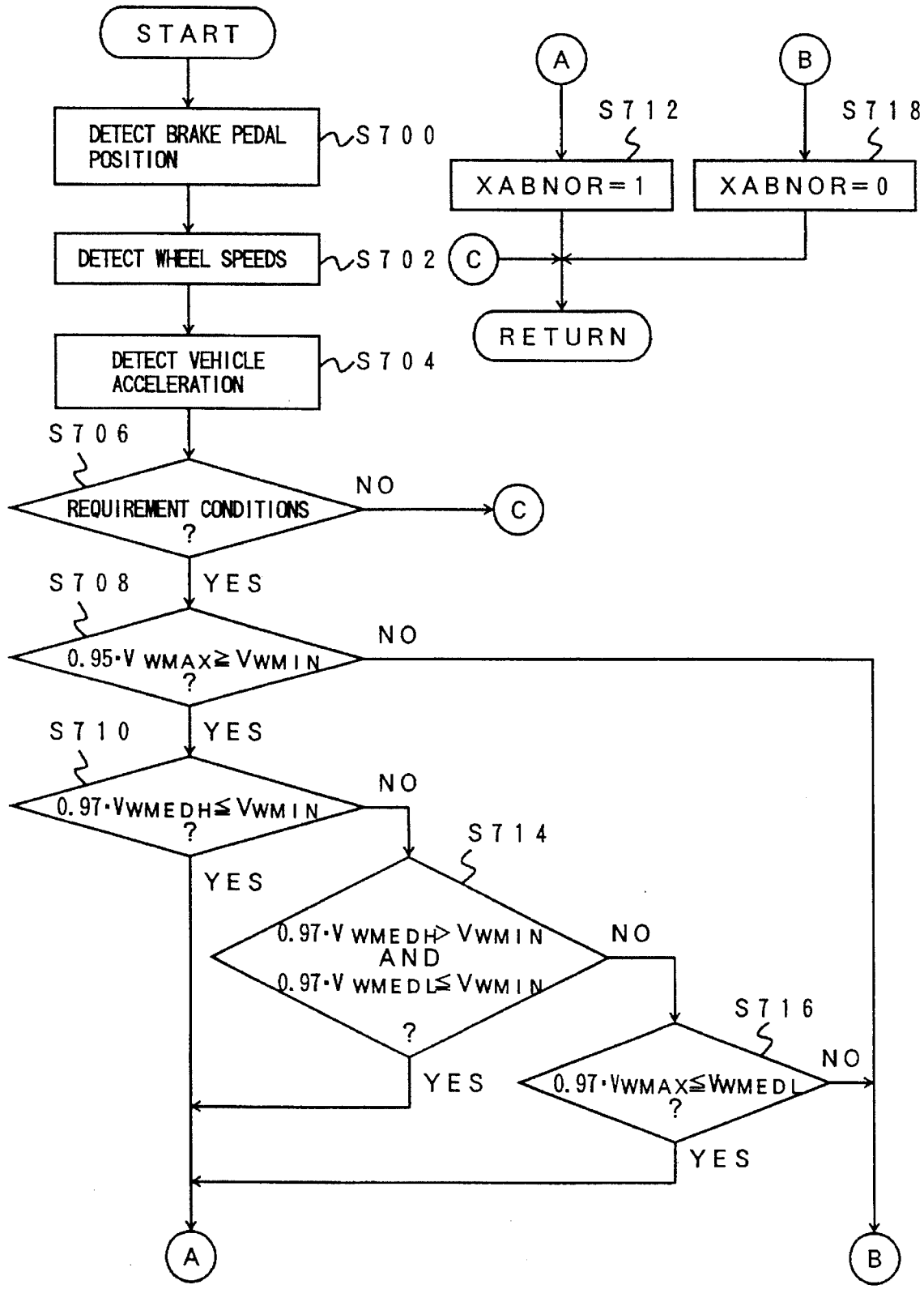
FIG. 7 is a flow diagram for explaining a spare tire detection process performed by a spare tire detecting part of the control unit in FIG. 3.

FIG. 7 shows the spare tire detection process performed by the spare tire detecting part 36 of the control unit 20 in FIG. 3. At the start of the spare tire detection process in FIG. 7, the spare tire detecting part 36 of the control unit 20, at step S700, detects the position of the brake pedal 27 in accordance with the signal supplied from the brake sensor 28. Step S702 detects the respective wheel speeds of the wheels 3a–3d in accordance with the signals supplied from the wheel speed sensors 7a–7d. Step S704 detects the vehicle accelerations in accordance with the signals output from the acceleration sensor 29.

Step S706 detects whether or not the requirement conditions for the spare tire detection process are satisfied. The requirement conditions include: 1) the brake pedal 27 is not depressed; 2) the minimum speed Vwmin among the four wheel speeds indicated by the signals output from the sensors 7a–7d is equal to or higher than 10 km/h; and 3) the acceleration sensor 29 is active and the absolute value of the sensor output is smaller than a given reference value, or the acceleration sensor 29 is inactive. If any of the above requirement conditions are not satisfied, the result at step S706 is negative, and the spare tire detection process in FIG. 7 is finished. If all of the above requirement conditions are satisfied, the result at step S706 is affirmative, and the following step S708 is performed.

Step S708 detects whether or not the value of the maximum speed Vwmax among the four wheel speeds, multiplied by 0.95, is equal to or higher than the minimum speed Vwmin. If the result at step S708 is affirmative (0.95·Vwmax≧Vwmin), the following step S710 is performed. If the result at step S708 is negative (0.95·Vwmax<Vwmin), step S718 is performed.

Step S710 detects whether or not the value of the second highest speed Vwmedh among the four wheel speeds, multiplied by 0.97, is equal to or lower than the minimum speed Vwmin. If the result at step S710 is affirmative (0.97·Vwmedh≦Vwmin), it is determined that the diameter of one of the four tires is smaller than the diameters of the other tires, and that a spare tire having a smaller diameter is possibly mounted on the vehicle. At this time, the tire corresponding to the maximum speed Vwmax may be the spare tire having the smaller diameter. Step S712 sets the abnormality flag to 1 (XABNOR=1), and the process in FIG. 7 is finished. On the other hand, if the result at step S710 is negative (0.97·Vwmedh>Vwmin), the following step S714 is performed.

Step S714 detects whether or not the value of the third highest speed Vwmedl among the four wheel speeds, multiplied by 0.97, is equal to or lower than the minimum speed Vwmin. If the result at step S714 is affirmative, it is determined that the diameters of two of the four tires are smaller than the diameters of the other tires, and that two spare tires having a smaller diameter may be mounted on the vehicle. At this time, the two tires corresponding to the maximum speed Vwmax and the second highest speed Vwmedh may be the spare tires having the smaller diameter. The above step S712 is performed to set the abnormality flag to 1 (XABNOR=1), and the detection process in FIG. 7 is finished. On the other hand, if the result at step S714 is negative, the following step S716 is performed.

Step S716 detects whether or not the value of the highest speed Vwmax among the four wheel speeds, multiplied by 0.97, is equal to or smaller than the third highest speed Vwmedl. If the result at step S716 is affirmative (0.97·Vwmax≦Vwmedl), it is determined that the diameter of one of the four tires is greater than the diameters of the other tires, and that another tire having a greater diameter may be mounted on the vehicle. At this time, the tire corresponding to the minimum speed Vwmin is possibly the tire having the greater diameter. The above step S712 is performed to set the abnormality flag to one (XABNOR=1), and the detection process in FIG. 7 is finished. On the other hand, if the result at step S716 is negative (0.97·Vwmax>Vwmedl), it is determined that all four of the tires have the same diameter and that the four tires are standard tires. Step S718 resets the abnormality flag to zero (XABNOR=0), and the detection process in FIG. 7 is finished.

Through the above described procedure, the control unit 20 can detect whether or not any spare tires having different diameters are mounted on the vehicle by checking the signal of the abnormality flag XABNOR. That is, if the flag XABNOR is equal to 1, it is determined that spare tires having different diameters are possibly mounted on the vehicle. If the flag XABNOR is equal to 0, it is determined that the four tires are standard tires and no spare tire is mounted.

Accordingly, the abnormality flag is set to 1 if any of the road holding ability reducing factors, including tire inflation pressure reduction, tire wear and the mounting of spare tires different from the standard tires (which will deteriorate the vehicle running stability and controllability performance and the braking performance) is detected by the road holding ability detecting unit. As described above, the function of the road holding ability detecting unit of the present invention is achieved by any of the tire inflation pressure detecting part 34, the tire wear detecting part 35, and the spare tire detecting part 36.

If the abnormality flag is equal to 1, the vehicle speed control part of the apparatus according to the present invention performs a vehicle speed control process so as to prevent the vehicle speed from becoming excessively high when the road holding ability of the tires drops. As described above, the vehicle speed control process is performed by any of the throttle control unit 30, the fuel injection control unit 31 and the transmission control unit 32. Each of the vehicle speed control processes performed by the control units 30–32 will be described in the following.

Figure 8:
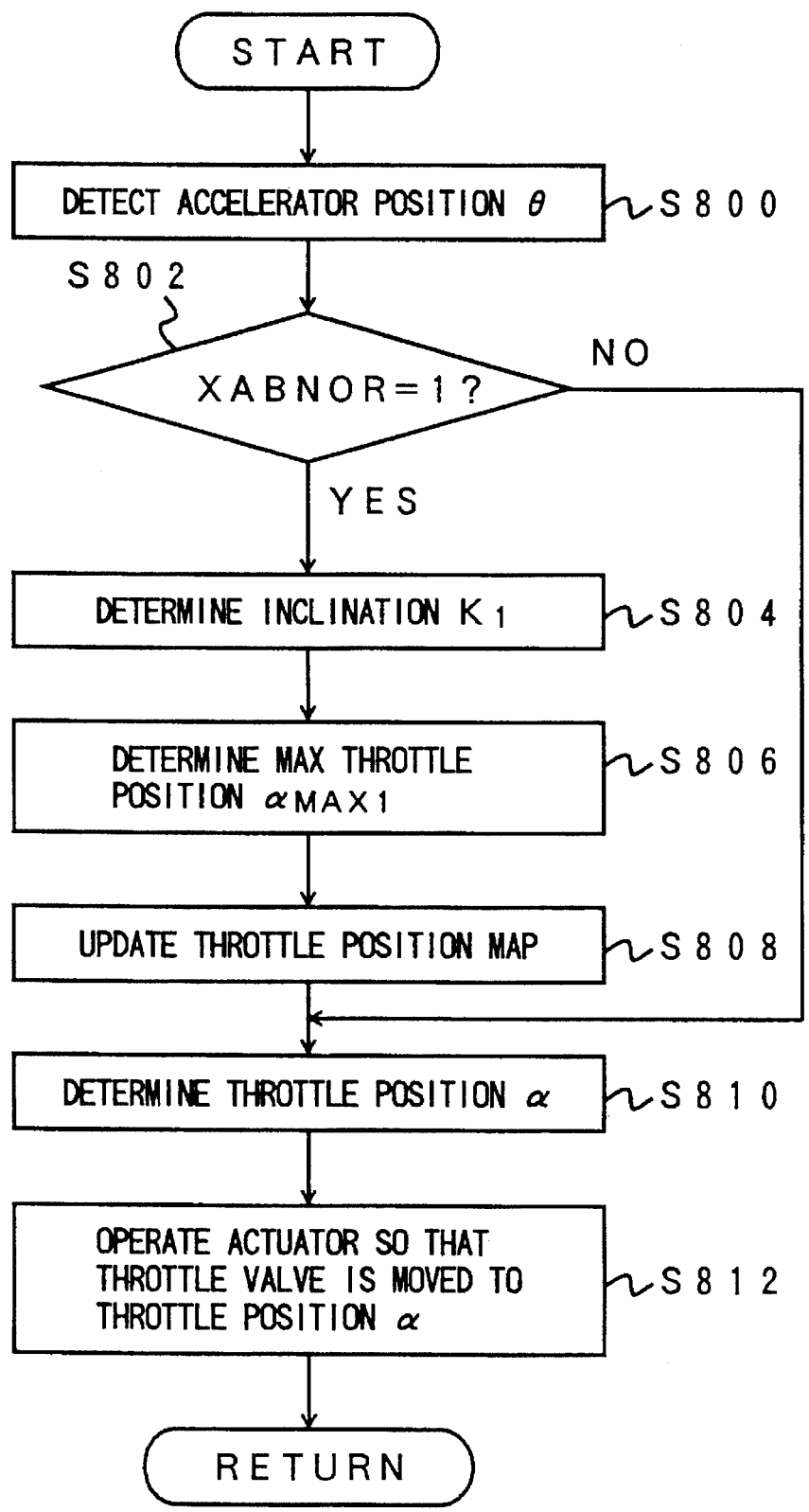
FIG. 8 is a flow diagram for explaining a vehicle speed control process performed by a throttle control unit in FIG. 3.

FIG. 8 shows the vehicle speed control process performed by the throttle control unit 30 in FIG. 3. If the abnormality flag is equal to 1, the throttle control unit 30 controls the throttle position of the throttle valve 23 so as to prevent the vehicle speed from becoming excessively high when the road holding ability of the tires is reduced.

At the start of the control process in FIG. 8, the throttle control unit (ECU) 30 of the control unit 20, at step S800, detects the accelerator position e of the accelerator pedal 22 in accordance with the signal output from the accelerator position sensor 24.

After step S800 is performed, step S802 detects whether or not the abnormality flag XABNOR obtained in the above described manner is equal to 1. If the result at step S802 is affirmative (XABNOR=1), it is determined that the road holding ability of one or more of the four tires is reduced. At this time, the following steps S804 through S808 are performed. On the other hand, if the result at step S802 is negative (XABNOR=0), the following steps S810 and S812 are performed and the steps S804 through S808 are not performed.

Briefly, in the control process in FIG. 8, step S804 determines the inclination (or gradient) K1 of the relationship between the throttle position $\alpha$ and the accelerator position $\Theta$. Step S806 determines a maximum throttle position $\alpha$max1. Step S808 updates the throttle position map stored in a memory of the throttle control unit (ECU) 30 based on the inclination (or gradient) K1 determined at step S804 and based on the maximum throttle position $\alpha$max1 determined at step S806.

Figure 9A:
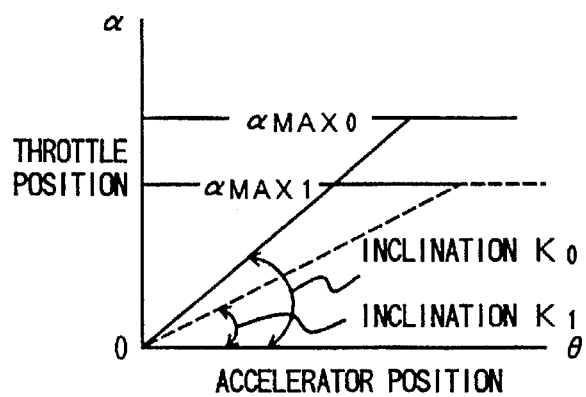
FIGS. 9A through 9C are charts for explaining the operation of the throttle control unit.

By referring to FIGS. 9A through 9C, the control operation of the throttle control unit 30 at steps S804–S808 will now be described in more detail. The throttle control unit (ECU) 30 has a read only memory (ROM) wherein a throttle position map shown in FIG. 9A is stored. The ROM of the throttle control unit 30 is not shown in the drawings. The throttle position map stored in the ROM of the throttle control unit 30 defines a two-dimensional relationship between the accelerator position $\Theta$ and the throttle position $\alpha$. As the accelerator position $\Theta$ is acquired by the throttle control unit 30 at step S800, the throttle control unit 30 determines a throttle position $\alpha$ corresponding to the accelerator position $\Theta$ based on the throttle position map stored in the ROM. The throttle control unit 30 operates the actuator 25 in accordance with the throttle position $\alpha$, so that the throttle valve 23 is moved to the throttle position $\alpha$ by means of the actuator 25.

In FIG. 9A, a throttle position map when the road holding ability is detected as being normal (the flag XABNOR=0) is indicated by a solid line, and a throttle position map when the road holding ability is detected as being abnormal (the flag XABNOR=1) is indicated by a dotted line. As shown in FIG. 9A, the throttle position map of the normal case indicated by the solid line defines a maximum throttle position $\alpha$maxo and an inclination Ko, and the throttle position map of the abnormal case indicated by the dotted line defines a maximum throttle position $\alpha$max1 and an inclination K1 which are respectively smaller than the maximum throttle position $\alpha$maxo and the inclination Ko. Accordingly, when the flag XABNOR is equal to 1, it is necessary to update the throttle position map stored in the ROM of the throttle control unit 30 for the correction of the throttle position of the throttle valve in response to a change of the road holding ability of the tires.

Figure 9B:
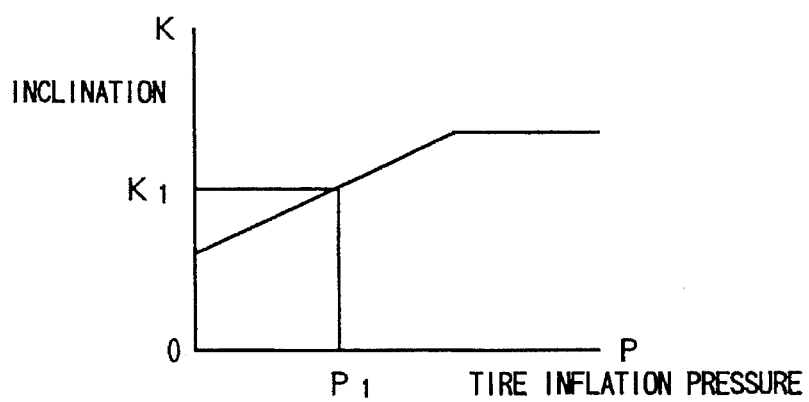

In the ROM of the throttle control unit 30, a predetermined inclination map shown in FIG. 9B is also stored. The inclination map stored in the ROM defines a two-dimensional relationship between the tire inflation pressure P and the inclination K, and this relationship is shown in FIG. 9B. If the result at step S802 in FIG. 8 is affirmative (the flag XABNOR=1), the throttle control unit 30 at step S804 determines an inclination K1 corresponding to the pressure P1 based on the inclination map stored in the ROM. This pressure P1 is the representative pressure P (the minimum value Pmin or the average value Pav) which is obtained at step S502 of the detection process in FIG. 5.

Figure 9C:
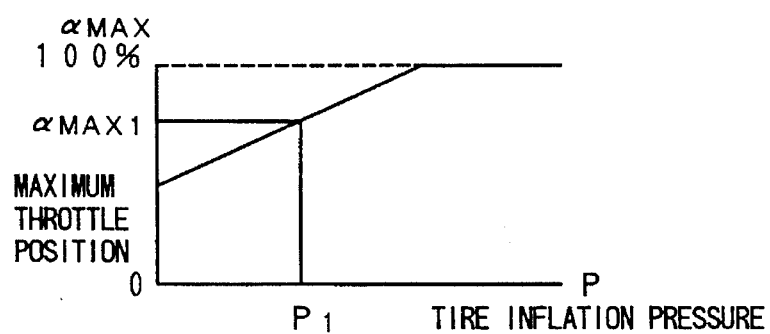

In the ROM of the throttle control unit 30, a predetermined maximum throttle position map shown in FIG. 9C is also stored. The maximum throttle position map stored in the ROM defines a two-dimensional relationship between the tire inflation pressure P and the maximum throttle position $\alpha$max, and this relationship is shown in FIG. 9C. After the step S804 is performed, the throttle control part 30 at step S806 determines a maximum throttle position $\alpha$max1 corresponding to the pressure P1 based on the maximum throttle position map stored in the ROM. This pressure P1 is the representative pressure P which is obtained at step S502 of the detection process in FIG. 5.

After the inclination K1 is determined at step S804 and the maximum throttle position $\alpha$max1 is determined at step S806, the throttle control unit 30 determines a new, modified relationship between the accelerator position $\Theta$ and the throttle position $\alpha$ based on the determined inclination K1 and maximum throttle position $\alpha$max1. This new relationship is indicated by a dotted line in FIG. 9A. The throttle control unit 30 at step S808 updates the relationship between the accelerator position and the throttle position stored in the ROM such that the chart indicated by the solid line is changed to the chart indicated by the dotted line.

After the step S808 is performed, the throttle control unit 30 at step S810 determines a throttle position $\alpha$ corresponding to the accelerator position $\Theta$ detected at step S800 based on the new relationship stored in the ROM. The throttle control unit 30 at step S812 operates the throttle valve actuator 25 so that the throttle valve 23 is moved to the throttle position determined at step S810.

As described above, the throttle control unit 30 performs the above steps S804–S812 in FIG. 8 if the flag XABNOR is equal to 1 and it performs only the steps S810 and S812 and does not perform the steps S804–S808 if the flag XABNOR is equal to 0. Thus, the throttle position set by the throttle control unit 30 when the road holding ability is detected as being reduced is smaller, with respect to the same accelerator position, than the throttle position set by the throttle control unit 30 when the road holding ability is detected as being normal. Accordingly, the vehicle speed control apparatus of the present invention prevents the vehicle speed from being excessively increased when the road holding ability is reduced.

The relationship between the tire inflation pressure and the inclination and the relationship between the tire inflation pressure and the maximum throttle position are shown in FIGS. 9B and 9C. However, the present invention is not limited to the example relating to the tire inflation pressure. For example, a modification wherein the relationship between the tire wear and the inclination, and the relationship between the tire wear and the maximum throttle position are predetermined can be used instead of the present embodiment. In addition, another modification wherein the relationship between the wheel speed and the inclination, and the relationship between the wheel speed and the maximum throttle position are predetermined can be used instead of the present embodiment.

Figure 10:
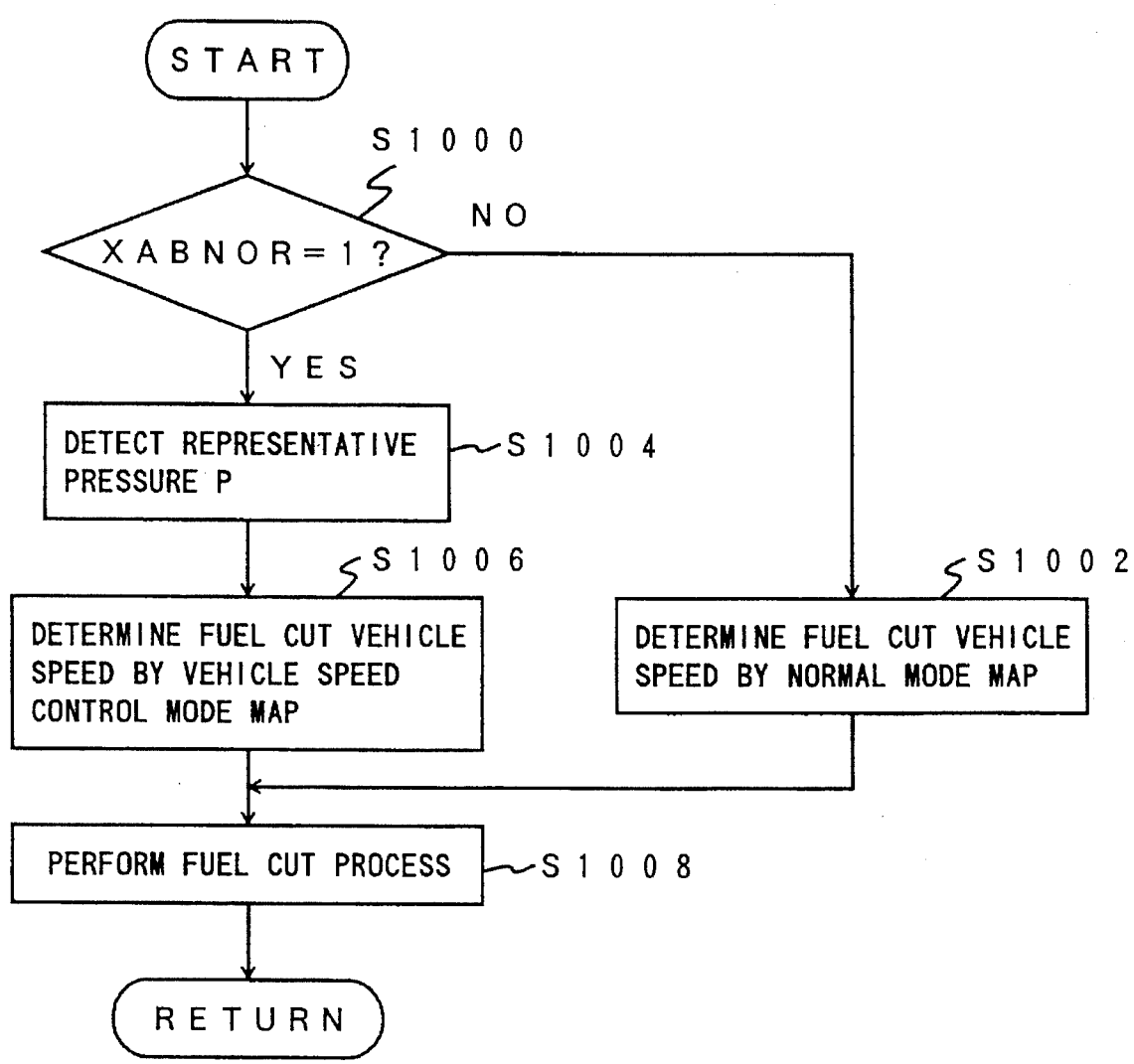
FIG. 10 is a flow diagram for explaining a vehicle speed control process performed by a fuel injection control unit of the control unit in FIG. 3.

Next, a description will be given, with reference to FIGS. 10 and 11, of a vehicle speed control process performed by the fuel injection control unit 31 of the control unit in FIG. 3. FIG. 10 shows the vehicle speed control process performed by the fuel injection control unit (EFI ECU) 31. This control process is performed by the fuel injection control unit 31 to lower the fuel-cut vehicle speed at the start of the execution of a fuel-cut control process if the road holding ability of the tires is detected as being reduced.

At the start of the vehicle speed control process in FIG. 10, the fuel injection control unit (EFI ECU) 31 at step S1000 detects whether or not the flag XABNOR is equal to 1. If the result at step S1000 is negative (the flag XABNOR=0), step S1002 determines a fuel-cut vehicle speed Vmax at the start of the execution of the fuel-cut control process, by using a normal mode map (not shown). After step S1002 is performed, the fuel injection control unit 31 at step S1008 starts performing the fuel-cut control process when the fuel-cut vehicle speed determined at step S1002 is reached.

On the other hand, if the result at step S1000 is affirmative (the flag XABNOR=1), it is determined that the road holding ability of the tires is reduced and that the vehicle has a problem causing vehicle running stability and controllability deterioration or a decline in braking performance. The fuel injection control unit (EFI ECU) 31 at step S1004 detects the representative pressure P which is obtained at step S502 of the detection process in FIG. 5. After step S1004 is performed, step S1006 determines a fuel-cut vehicle speed Vmax based on the representative pressure P at step S1004 by using a vehicle speed control mode map. After step S1006 is performed, the fuel injection control unit 31 at step S1008 starts performing the fuel-cut control process when the fuel-cut vehicle speed of step S1006 is reached.

The fuel injection control unit 31 has a read only memory (ROM) wherein the vehicle speed control map is stored. The vehicle speed control map stored in the ROM defines a two-dimensional relationship between the representative pressure P and the fuel-cut vehicle speed Vmax, and this relationship is shown in FIG. 11. Based on the vehicle speed control map shown in FIG. 11, the fuel-cut vehicle speed Vmax is determined if the representative pressure P is given. As indicated in FIG. 11, if the representative pressure P is changed to a lower pressure, the fuel-cut vehicle speed Vmax is also changed to a lower vehicle speed. Thus, if the road holding ability of the tires is detected as being reduced, the fuel-cut vehicle speed at the start of the execution of the fuel-cut control process is changed to a lower vehicle speed, so that the vehicle running stability and controllability deterioration and the decline in braking performance can be eliminated.

Figure 11:
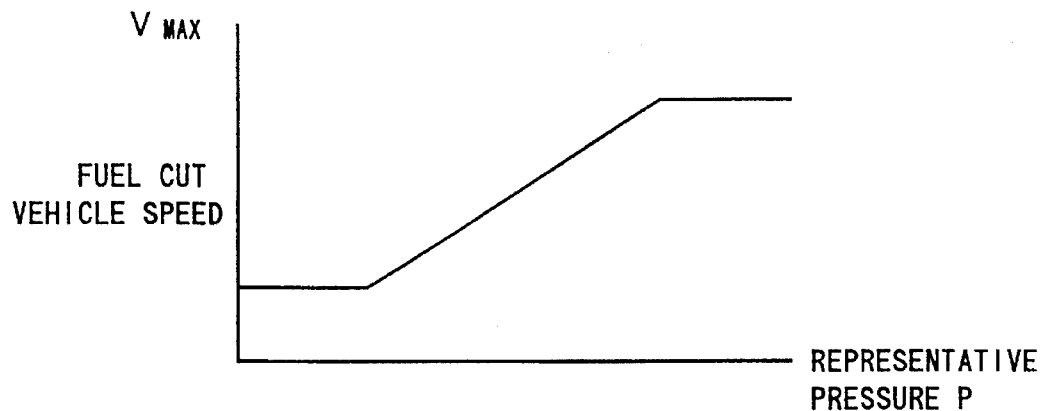
FIG. 11 is a chart for explaining the operation of the fuel injection control unit.

The relationship between the representative pressure P and the fuel-cut vehicle speed Vmax is shown in FIG. 11. However, the present invention is not limited to this example. For example, a modification wherein the relationship between the tire wear and the fuel-cut vehicle speed is predetermined can be used instead of the present embodiment. In addition, another modification wherein the relationship between the wheel speed and the fuel-cut vehicle speed is predetermined can be used instead of the present embodiment.

Figure 12:
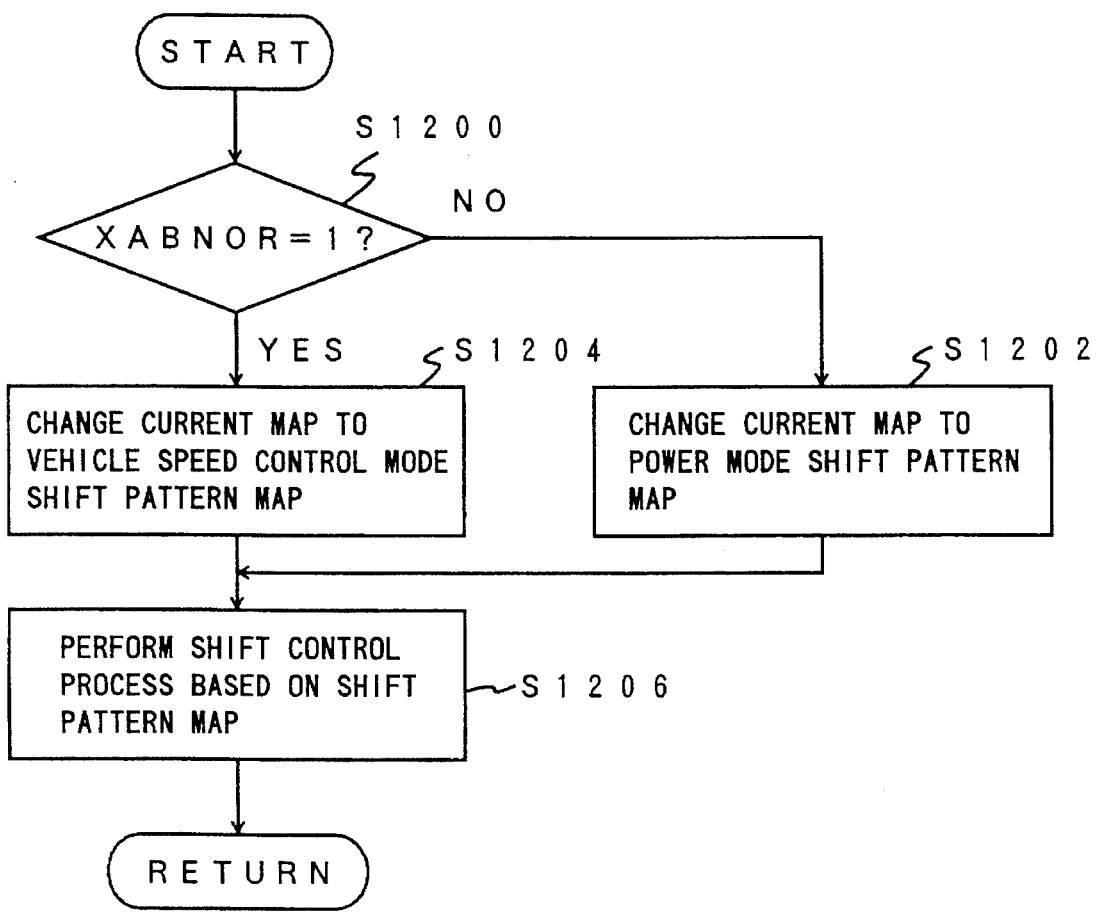
FIG. 12 is a flow diagram for explaining a vehicle speed control process performed by a transmission control unit of the control unit in FIG. 3.

Next, a description will be given, with reference to FIGS. 12 through 14, of a vehicle speed control process performed by the transmission control unit 31 of the control unit in FIG. 3. FIG. 12 shows the vehicle speed control process performed by the transmission control unit (ECT ECU) 32. This control process is performed by the transmission control unit 32 in order to change the current shift control map of the transmission control unit 32 to a vehicle speed control mode shift pattern map if the road holding ability of the tires is detected as being reduced, thereby preventing the vehicle speed from being excessively increased on this occasion.

At the start of the vehicle speed control process in FIG. 12, the transmission control unit (ECT ECU) 32 at step S1200 detects whether or not the flag XABNOR is equal to 1. If the result at step S1200 is negative (the flag XABNOR=0), step S1202 changes the current shift control map of the ECT ECU 32 to a power mode shift pattern map shown in FIG. 14.

The transmission control unit 32 has a read only memory (ROM) wherein the power mode shift pattern map is stored. The vehicle acceleration or the shift up operation of the automatic transmission 4 is more sensitive when the power mode shift pattern map shown in FIG. 14 is used by the ECT ECU 32 to perform the shift control process of the automatic transmission 4. After step S1202 is performed, step S1206 performs the shift control process of the automatic transmission 4 based on the power mode shift pattern map at step S1202.

On the other hand, if the result at step S1200 is affirmative (the flag XABNOR=1), step S1204 changes the current shift pattern map of the ECT ECU 32 to a vehicle speed control mode shift pattern map. This shift pattern map is shown in FIG. 13, and the vehicle acceleration is less sensitive when this shift pattern map is used by the ECT ECU 32 to perform the shift control process of the automatic transmission 4. After step S1204 is performed, step 1206 performs the shift control process of the automatic transmission 4 based on the vehicle speed control mode shift pattern map selected at step S1204. At this time, the vehicle speed is prevented by the transmission control part 32 from being excessively increased when the road holding ability is reduced, as the shift control process of the automatic transmission 4 is performed based on the shift pattern map shown in FIG. 13. Thus, it is possible to eliminate the vehicle running stability and controllability deterioration and the decline in braking performance.

In the above described embodiment, the function of the vehicle speed control part of the apparatus according to the present invention is achieved by any of the throttle control unit 30, the fuel injection control unit 31 and the transmission control unit 32. Any reduction of the road holding ability of the tires is detected by the road holding ability detecting unit of the apparatus of the present invention. The function of the road holding ability detecting unit is achieved by any of the tire inflation pressure detecting part 34, the tire wear detecting part 35 and the spare tire detecting part 36. When the road holding ability is detected by the detecting unit as being reduced, the vehicle speed control part performs the vehicle speed control process so as to prevent the vehicle speed from being excessively increased. Thus, it is possible for the present invention to eliminate the vehicle running stability and controllability deterioration and the braking performance decline when the road holding ability is reduced.

Further, the present invention is not limited to the above described embodiment, and variations and modifications may be made without departing from the scope of the present invention.

What is claimed is:

1. A safety apparatus for controlling vehicle speed in response to a change in a road holding ability related to tires of an automotive vehicle, comprising:

detecting means for detecting a tire condition that degrades road holding ability from a plurality of conditions including tire inflation pressure, tire wear and tire size, when at least one detected condition of tire inflation pressure of the tires, tire wear of the tires and tire sizes has changed to be below a reference value appropriate to the detected condition indicates a decrease in the road holding ability of affected tires; and control means for performing at least one vehicle speed control process to prevent the vehicle speed from being increased beyond a preset threshold when the decrease in the road holding ability is detected by said detecting means, said at least one control process being selected from a throttle control process, a fuel injection control process and a transmission control process.

2. A vehicle speed control apparatus according to claim 1, wherein said detecting means comprises tire inflation pressure means for determining a pressure representative of tire inflation pressures of the tires, so that the reduction of the road holding ability is detected by said detecting means when the determined representative pressure is lower than a reference pressure value.

3. A vehicle speed control apparatus according to claim 2, further comprising a tire inflation pressure sensor for each tire, wherein said tire inflation pressure means comprises means for detecting the respective tire inflation pressures of each of the tires in accordance with signals output from the tire inflation pressure sensors.

4. A vehicle speed control apparatus according to claim 1, wherein said detecting means comprises tire wear means for determining a tire wear value of the tires, so that said detecting means detects the road holding ability as being lower than the reference value when the determined tire wear value is smaller than a reference tire wear value.

5. A vehicle speed control apparatus according to claim 4, wherein said tire wear means comprises means for detecting accclerations of the automotive vehicle in accordance with signals output from an acceleration sensor arranged in the vehicle and means for detecting a running distance of the vehicle in accordance with a signal output from a running distance sensor arranged in the vehicle.

6. A vehicle speed control apparatus according to claim 1, wherein said detecting means comprises spare tire detecting means for detecting whether a spare tire having a diameter different from a standard tire diameter is mounted on the automotive vehicle so that said detecting means detects the road holding ability as being lower than the reference value when said spare tire detecting means detects that the spare tire is mounted on the vehicle.

7. A vehicle speed control apparatus according to claim 6, wherein said spare tire detecting means comprises: means for detecting a position of a brake pedal of the vehicle in accordance with a signal output from a brake sensor arranged in the vehicle; means for detecting the respective wheel speeds of the four wheels of the vehicle in accordance with signals output from wheel speed sensors arranged in the vehicle; and means for detecting vehicle accelerations in accordance with signals output from an acceleration sensor arranged in the vehicle.

8. A vehicle speed control apparatus according to claim 1, wherein said control means comprises throttle control means for executing said throttle control process by operating a throttle valve actuator in accordance with a throttle position, and said throttle control means comprises means for determining a throttle position based on a throttle position map, the throttle position map being selected according to a pressure representative of tire inflation pressures of the tires when said detecting means detects the road holding ability as being lower than the reference value, whereby the throttle valve actuator is operated by the throttle control means so that a throttle valve of the vehicle is moved to the determined throttle position so as to prevent the vehicle speed from being excessively increased when the road holding ability is reduced.

9. A vehicle speed control apparatus according to claim 1, wherein said control means comprises fuel injection control means for executing said fuel injection control process by performing a fuel-cut control process on fuel injection valves arranged in the vehicle, and said fuel injection control means comprises means for determining a fuel-cut vehicle speed based on a fuel-cut vehicle speed map, the fuel-cut vehicle speed map being selected according to a pressure representative of tire inflation pressures of the tires when said detecting means detects the road holding ability as being lower than the reference value, whereby the fuel-cut control process is performed by the fuel injection control means so as to prevent the vehicle speed from being excessively increased when the road holding ability is reduced.

10. A vehicle speed control apparatus according to claim 1, wherein said control means comprises transmission control means for executing said transmission control process by performing a shift control process of an automatic transmission of the vehicle, and said transmission control means comprises means for selecting one of a vehicle speed control mode and a power mode based on whether said detecting means detects the road holding ability as being lower than the reference value or not, whereby the shift control process is performed by the transmission control means based on the selected mode so as to prevent the vehicle speed from being excessively increased when the road holding ability is reduced.

* * * * *